United States Patent
Bach et al.

(10) Patent No.: US 12,346,288 B2
(45) Date of Patent: Jul. 1, 2025

(54) MIGRATION OF DATASETS AMONG FEDERATED DATABASE SYSTEMS

(71) Applicant: Ab Initio Technology LLC, Lexington, MA (US)

(72) Inventors: Edward Alan Bach, Melrose, MA (US); Matthew Eads, Lexington, MA (US)

(73) Assignee: Ab Initio Technology LLC, Lexington, MA (US)

( * ) Notice: Subject to any disclaimer, the term of this patent is extended or adjusted under 35 U.S.C. 154(b) by 0 days.

(21) Appl. No.: 18/442,567

(22) Filed: Feb. 15, 2024

(65) Prior Publication Data

US 2024/0378177 A1 Nov. 14, 2024

Related U.S. Application Data

(60) Provisional application No. 63/501,610, filed on May 11, 2023.

(51) Int. Cl.
*G06F 16/00* (2019.01)
*G06F 16/11* (2019.01)
(Continued)

(52) U.S. Cl.
CPC .......... *G06F 16/119* (2019.01); *G06F 16/116* (2019.01); *G06F 16/128* (2019.01); *G06F 16/137* (2019.01); *G06F 16/256* (2019.01)

(58) Field of Classification Search
CPC .... G06F 16/119; G06F 16/256; G06F 16/116; G06F 16/137; G06F 16/128; G06F 8/63;
(Continued)

(56) References Cited

U.S. PATENT DOCUMENTS 5,966,072 A  10/1999  Stanfill et al.
9,892,026 B2  2/2018  Isman et al.
(Continued)

OTHER PUBLICATIONS en.wikipedia.org [online], "Extract, transform, load," Mar. 15, 2023, retrieved on Oct. 8, 2024, retrieved from URL<https://en.wikipedia.org/w/index.php?title=Extract,_transform,_load&olddid=1144739845>, 10 pages.

(Continued)

*Primary Examiner* — Yicun Wu
(74) *Attorney, Agent, or Firm* — Fish & Richardson P.C.

(57) ABSTRACT

In an aspect, a method for migrating data records to a federated database system includes obtaining data records from a data source in a first federated database system; generating a data snapshot file based on the obtained data records and data indicative of a characteristic associated with the obtained data records; generating a hash of the data snapshot file to prevent modification of the data snapshot file; storing the data snapshot file and the generated hash in a data storage; migrating the obtained data records from the data snapshot file to a data target in a second federated database system, the migrating including: retrieving the data records from the data snapshot file stored in the data storage; providing the retrieved data records to the data target according to a mapping between a characteristic of the data source and a characteristic of the data target.

34 Claims, 6 Drawing Sheets

(51) Int. Cl.
*G06F 16/13* (2019.01)
*G06F 16/25* (2019.01)

(58) Field of Classification Search
CPC ............. G06F 9/45558; G06F 11/1446; G06F 11/1402; G06F 9/5077; G06F 9/461; G06T 1/00; G06T 1/0007
See application file for complete search history.

(56) References Cited

U.S. PATENT DOCUMENTS

| | | | |
|---|---|---|---|
| 10,185,641 | B2 | 1/2019 | Isman et al. |
| 2007/0011668 | A1 | 1/2007 | Wholey et al. |
| 2014/0146055 | A1* | 5/2014 | Bala ................... G06F 8/63 345/501 |
| 2019/0205429 | A1 | 7/2019 | Lee |
| 2020/0380212 | A1 | 12/2020 | Butler et al. |
| 2023/0169053 | A1 | 6/2023 | Anderson |
| 2023/0179401 | A1* | 6/2023 | Singh ................. H04L 67/06 713/171 |

OTHER PUBLICATIONS

International Search Report and Written Opinion in International Appln. No. PCT/US2024/028621, mailed on Sep. 9, 2024, 13 pages.
Kimball et al., "ETL Data Structures," The Data Warehouse ETL Toolkit: Practical Techniques for Extracting, Cleaning, Conforming, and Delivering Data, Wiley Publishing, Oct. 2004, Chapter 2, pp. 29-52.

* cited by examiner

MIGRATION OF DATASETS AMONG FEDERATED DATABASE SYSTEMS

CLAIM OF PRIORITY

This application claims priority to U.S. Patent Application Ser. No. 63/501,610, filed on May 11, 2023, the entire contents of which are hereby incorporated by reference.

BACKGROUND

A federated database system is a distributed database management system that includes multiple data sources, such as relational data sources and/or non-relational data sources (e.g., databases, tables, files, SQL servers, or other types of data sources), storing data records in various formats. A federated database system includes a federation server that manages a federated database, which acts as a single, collective database presenting user-facing access to the multiple underlying data sources. A federated database system also includes a federated database system catalog, which contains information about the data records in the federated database and the data in the data sources of the federated database system.

SUMMARY

We describe here a flexible and efficient way to migrate a dataset from one environment to a different, target environment, even if the target environment demands a different record format than the original format of the data. This is especially useful when the need arises to be able to process data in source and target environments and/or when establishing data exchange between the source environment having the source's record format and the target environment having the target's record format. For instance, these approaches are relevant to data migration to, from, and within federated data catalogs, where datasets are stored in a variety of different formats. These approaches can involve automatically applying the correct transforms to data as part of migrating data in the context of a federated data catalog, for instance, automatically transforming the record format of the source data to match the record format of the target environment. These approaches can alternatively or additionally involve automatically masking sensitive fields to keep personally identifying information secure and to comply with data privacy requirements. During the migration, relevant metadata that identifies the source of the data are retained, which is important for traceability and maintenance of audit trails and data lineage.

In an aspect, a method for migrating data records to a federated database system includes obtaining data records from a data source in a first federated database system; generating a data snapshot file based on the obtained data records and data indicative of a characteristic associated with the obtained data records; generating a hash of the data snapshot file to prevent modification of the data snapshot file; storing the data snapshot file and the generated hash in a data storage; migrating the obtained data records from the data snapshot file to a data target in a second federated database system, the migrating including: retrieving the data records from the data snapshot file stored in the data storage; providing the retrieved data records to the data target according to a mapping between a characteristic of the data source and a characteristic of the data target.

Embodiments can include one or any combination of two or more of the following features.

The migrating includes confirming that the data snapshot file that was stored in the data storage has not been edited, and wherein the retrieving of the data records from the data snapshot file is performed responsive to the confirming. In some cases, confirming that the data snapshot file has not been edited includes: recalculating the hash of the data snapshot file that was stored in the data storage; and comparing the recalculated hash to the generated hash.

The mapping between the characteristic of the data source and the characteristic of the data target includes a specification of a second record format of data records of the data target, and in which the migrating includes determining a correspondence between a first record format of the data records from the data source and the second record format of data records of the data target. In some cases, the method includes, when the first record format is different from the second record format, transforming the retrieved data records into the second record format in accordance with the correspondence; and providing the transformed data records to the data target. In some cases, the method includes processing, by the second federated database system, the data records provided to the data target in accordance with the second record format. In some cases, the second federated database system does not have built-in functionality to process the retrieved data records in accordance with the first record format.

The method includes providing the retrieved data records to the data target according to a mapping between a naming convention used by the data source and a naming convention used by the data target.

The data indicative of the characteristic associated with the obtained data records includes one or more of a name of the data source or a location of the data source.

The data indicative of the characteristic associated with the obtained data records includes metadata associated with the data records. In some cases, the metadata associated with the data records include a specification of a first record format of the obtained data records.

Generating the data snapshot file includes including data indicative of a data governance rule associated with the source system.

The method includes masking sensitive data, such as data associated with personally identifying information, contained in one or more fields of the obtained data records prior to generating the data snapshot file. In some cases, generating a data snapshot file based on the obtained data records includes generating a data snapshot file that includes the masked data records. In some cases, the metadata associated with the data records include data specifying a transformation used for the masking of the data contained in the obtained data records. In some cases, generating the data snapshot file includes including data in the file identifying the one or more fields of the data records that were subject to the masking. In some cases, the method includes identifying the one or more fields containing the sensitive data based on a semantic analysis of a name of each of the one or more fields. In some cases, generating the hash includes generating a hash of data indicative of a masking algorithm applied to mask the sensitive data.

Obtaining the data records includes selecting a subset of the data records contained in the data source, the selecting based on values in each of one or more fields of the data records contained in the data source. In some cases, generating a data snapshot file based on the obtained data records includes generating a data snapshot file including the selected subset of the data records. In some cases, the metadata associated with the data records include data specifying a subsetting algorithm used to select the subset of the data records contained in the data source. In some cases, generating the hash includes generating a hash of data indicative of a selection algorithm applied to select the subset of the data records.

The method includes generating data records for inclusion in the obtained data records prior to generating the data snapshot file. In some cases, generating a data snapshot based on the obtained data records includes including the obtained data records and the generated data records in the data snapshot. In some cases, the method includes generating data based on a distribution of values in each of one or more fields of the data records obtained from the data source. In some cases, generating the hash includes generating a hash of data indicative of a data generation algorithm applied to generate the data records.

The method includes, responsive to a request for a lineage of the transformed data records at the data target, providing data indicative of the data source in the first federated database system.

The method includes responsive to a request for a lineage of the transformed data records at the data target, providing data indicative of a transformation applied to the data records.

The retrieved data records are provided to the data target only after the confirming that the data snapshot file has not been edited.

The characteristic of the data source includes a first record format of the data records from the data source and the characteristic of the data target includes a second record format of data records of the data target. In some cases, providing the retrieved data records to the data target according to the mapping includes transforming the record format of the retrieved data records to match the second record format. In some cases, transforming the record format of the retrieved data records to match the second record format includes reformatting the retrieved data records.

In a second aspect, combinable with the first aspect, a non-transitory computer readable storage medium storing instructions that, when executed by one or more processors, cause the one or more processors to perform the operations of the foregoing aspect, including one or any combination of two or more of the foregoing embodiments.

In a third aspect, combinable with the first or second aspect, a system including one or more processors coupled to a memory, the memory storing instructions that, when executed by the one or more processors, cause the one or more processors to perform the operations of the foregoing aspect, including one or any combination of two or more of the foregoing embodiments.

The details of one or more implementations are set forth in the accompanying drawings and the description below. Other features and advantages will be apparent from the description and drawings, and from the claims.

DETAILED DESCRIPTION

Figure 1:
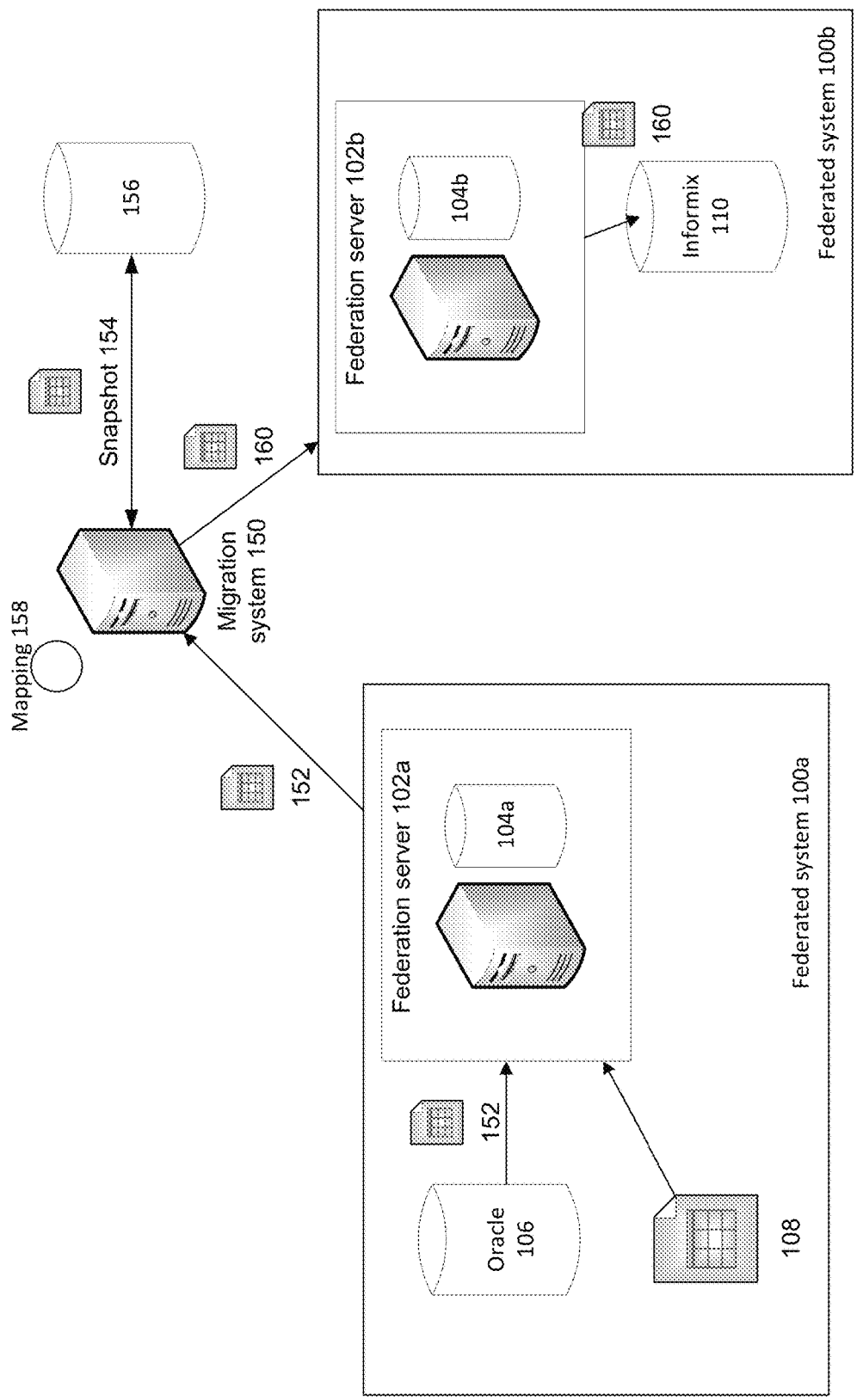
FIG. 1 is a schematic diagram of dataset migration between federated database systems.

We describe here a flexible and efficient way to migrate a dataset from one environment to a different, target environment, even if the target environment demands a different record format than the original format of the data. For instance, these approaches are relevant to data migration to, from, and within federated data catalogs, where datasets are stored in a variety of different formats. These approaches can involve automatically applying the correct transforms to data as part of migrating data in the context of a federated data catalog, for instance, automatically transforming the record format of the source data to match the record format of the target environment. These approaches can alternatively or additionally involve automatically masking sensitive fields to comply with data privacy requirements. During the migration, relevant metadata that identifies the source of the data are retained, which is important for traceability and maintenance of audit trails.

Generally, a migration system extracts data from a federated database system for migration to a target environment. The system stores the extracted data as a versioned snapshot, while retaining relevant information about the data, such as its record format, relationships within the extracted data set or with other data, and the original source of the data set. Moreover, the system applies appropriate transforms to the data as part of the migration process, for instance, transforming the record format of the extracted data to match the record format of the target environment or masking sensitive fields to comply with data privacy requirements.

One advantage of the approaches described here comes when the approaches are applied to large collections of data that are obtained from heterogeneous data sources, and that are destined for migration to a wide variety of target environments. For instance, data stored in a federated database system are often sourced from a diverse set of data sources, and thus data can be present in the federated system in a variety of different record formats. Sometimes, the format in which data are stored in the federated system is not consistent with requirements for data stored in the target environment-particularly when considering that a large number of target environments may be available for migration in the target federated system. The ability to transform the record format of extracted data within a wide range of potential record format requirements makes these approaches broadly applicable to the heterogeneous nature of federated database systems.

Another advantage to the approaches described here is the ability to mask sensitive fields prior to snapshotting as part of the migration process and to tie this information to the snapshot. Again, this masking capability is applicable across a wide range of record formats given the diversity of data housed in a federated database system. Because migration of data may mean that data are taken out of a secure or controlled environment, the ability to mask sensitive information prior to snapshotting and then tie the snapshot to the masking and governance process from whence the masked snapshotted data originated is crucial for maintaining compliance with privacy and data security requirements.

Furthermore, the migration system retains information identifying and characterizing the extracted data throughout the migration process, so that data can be traced back to its original data source. For instance, the migration system may generate a unique identifier, such as a key that is a hash of the data extract itself, that is usable to trace the data extract back to its origin. The retention of this identification of the original source of a data extract is important for maintenance of relationships among data sets and for traceability, e.g., in the event of a quality issue.

FIG. 1 illustrates a schematic depiction of approaches to migration of data, such as data records, in the context of a federated database system. The migration can be between data sources within a single federated database system, from a data source in one federated database system to a data source in a different federated database system, or from a data source in a federated database system to a data storage that is not part of a federated database system, e.g., a local data storage.

A federated database system is a distributed database management system that includes multiple data sources, such as relational data sources and/or non-relational data sources (e.g., various types of databases, tables, files, or other types of data sources), storing data records in various formats. A federated database system includes a federation server that manages a federated database, which acts as a single, collective database presenting user-facing access to the multiple underlying data sources. A federated database system also includes a federated database system catalog, which contains information about the data records in the federated database and the data in the data sources of the federated database system. In general, data records are structured data that include fields containing values.

Migration of data records in the context of a federated database system can be challenging because of the various data formats supported by the data sources in federated database systems, the various database schema supported by the data sources in federated database systems, and other differences stemming from the diversity of data sources available in federated database systems. The data record migration approaches illustrated in FIG. 1 enable automatic migration of data from one data source to another, e.g., within a single federated database system or from one federated database system to another, accounting for such differences. Along with the migration of the data, these approaches maintain relevant metadata that indicate the origin of the data and that indicate any transforms applied to the data as part of the migration process, thus facilitating traceability and auditability of data lineage. Moreover, these data migration approaches prevent editing of the data during the migration process. Furthermore, these data migration approaches can comply with privacy or anonymization requirements.

FIG. 1 illustrates two federated database systems 100*a*, 100*b* (collectively referred to as federated database systems 100) although the approaches described here are applicable to any suitable number of federated database systems. Each federated database system includes a federation server 102*a*, 102*b* including a federated database 104*a*, 104*b* and a federated database system catalog (not shown). Each federated database system 100 also includes one or more data sources, e.g., the federated database system 100*a* includes at least a Oracle database 106 and an XML file 108 and the federated database system 100*b* includes at least an Informix database 110. Federated database systems in general include multiple data sources, e.g., many more than the data sources illustrated.

A migration system 150 manages and implements migration of datasets from one data source to another, such as between data sources in a single federated database system or from a data source in one federated database system (e.g., federated database system 100*a*) to a data source in a different federated database system (e.g., federated database system 100*b*). Generally, the migration system 150 obtains one or more datasets (e.g., including data records) from a data source in a federated database system (e.g., the database 106 in the federated database system 100*a*), stores the obtained datasets in a data snapshot file, and provides the datasets to a data target (e.g., the database 110 in the federated database system 100*b*). Metadata characterizing the obtained datasets is retained in the data snapshot file, helping to provide traceability. The snapshot file is secured, e.g., by a hash function, which provides security that prevents editing of the datasets prior to migration to the target.

In a first portion of the migration process, the migration system 150 obtains one or more datasets 152 from the data source (e.g., the database 106). The obtained datasets can be in the form of a table, a file, a database schema, or another suitable format. The obtained datasets can be a single dataset from a single database of the federated database system 100*a* or can be multiple datasets from a single database or from multiple databases of the federated database system 100*a*.

The migration system 150 writes the obtained datasets 152 to a data snapshot 154. The data snapshot 154 is a package, such as a directory and its files, archive containing files, or other data object such as an AWS bucket, that contains the datasets and metadata characterizing the datasets. For instance, the data snapshot is a compressed data file containing the datasets and metadata characterizing the datasets. In some examples, the metadata can be recorded on a per-dataset basis, e.g., metadata characterizing each individual dataset 152 is stored in the data snapshot 154 in association with the corresponding dataset. Alternatively or additionally, metadata relevant to all of the datasets 152 is stored in the data snapshot 154 without an association to any particular dataset. The metadata characterizing the datasets can be metadata characterizing data records of the datasets, e.g., the record format of the datasets or the parallelism (partitioning) of the datasets. The metadata can include metadata characterizing the source of the datasets, e.g., the identity of the federated database system 100*a* from whence the datasets originated, the identity of the database within the federated database system 100*a* from whence each individual dataset originated, the name of each dataset in its original source database, the catalog instance, version, or timestamp. The metadata can include metadata characterizing transformations applied to the datasets 152 prior to writing the datasets to the data snapshot (discussed further below).

The migration system 150 also generates a unique identifier based on the contents of the data snapshot, such as a hash of the contents of the data snapshot. The data snapshot 154, with the hash watermarked into the data snapshot, is stored in a data storage 156, such as a versioned artifact repository. The data storage can be part of the migration system 150 or external to the migration system 150.

In some examples, a single hash is generated based on the entire contents of the data snapshot, e.g., based on all of the datasets included in the data snapshot. In some examples, a hash is generated for each of the datasets included in the data snapshot.

In a second portion of the migration process, the migration system 150 migrates the obtained datasets from the data snapshot 154 in data storage 156 to the target destination (e.g., the database 110). Prior to migration, the migration system 150 confirms that the data snapshot 154 has not been edited by recomputing the hash and comparing the recomputed hash to the hash that is watermarked into the data snapshot 154. If the recomputed hash matches the hash in the data snapshot 154, the migration system 150 confirms that the datasets in the data snapshot have not been edited. Responsive to confirming that the data snapshot has not been edited, the migration system 150 retrieves the datasets from the data snapshot 154 in data storage 156 for migration to the target destination 110.

When a single hash is generated for the entire data snapshot 154, the recomputation of the hash confirms that none of the datasets has been edited. When a hash is generated for each dataset of the data snapshot 154, the migration system 150 can confirm on a per-dataset basis that each dataset has not been edited. The migration system 150 can then retrieve individual datasets from the data snapshot 154 for migration to the target destination 110, e.g., without necessarily migrating the entire contents of the data snapshot 154.

The migration system 150 applies a source-to-target mapping 158 when migrating the datasets from the data snapshot 154 to the target destination. The mapping 158 identifies the specific target destination (e.g., the database 110) for migration of the dataset. The mapping 158 also can specify transformations to be applied to the datasets such that their format is compatible with the format of the target destination. The mapping 158 can be a default mapping, e.g., applicable to periodic dataset migrations; a mapping 158 specified by a user; or a mapping 158 determined automatically by the migration system 150. In a specific example, a user specifies the target destination 110 for a dataset to be migrated from the data source 106, and the migration system 150 automatically determines relevant transformations based on an analysis of the formats of the data source 106 and the target destination 110. This relevant transformations may be specified by the mapping 158.

In one example, the mapping 158 specifies a record format of the data records at the target destination, and if the record format of the data records in the data snapshot 154 does not match the specified record format, the migration system 150 reformats (transforms) the data records prior to migrating the data records to the target destination to match the record format at the target destination. The mapping 158 can specify the transformation to be applied, or the mapping 158 can specify the record format of the target and the migration system 150 can determine the transformation based on the mapping 158 and on the record format of the obtained data records.

In another example, the mapping 158 specifies a naming convention for schema and tables in the target database 110, and the migration system 150 renames tables or schema of the datasets in the data snapshot 154 according to the target naming convention. In an illustrative example, the source database 106 may use a dotted notation for its database naming convention while the target database 110 uses a slash notation. In another example, the source database 106 may have a database naming convention for the hierarchical database.schema.table of DB_name.sales.table_name while to match the naming convention of the target database 110, the table is renamed to DB_name.USsales.table_name.

In some examples, the source-to-target mapping 158 is specified by a user, e.g., an administrator overseeing the migration process. In some examples, the source-to-target mapping 158 is automatically determined, e.g., based on an automated analysis by the migration system 150 of the source and target databases 106, 110.

Transformed datasets 160 generated by application of the mapping 158 to the datasets retrieved from the data snapshot 154 are provided to the federated database system 100b for storage at the target, e.g., at the database 110.

In some examples, the migration system 150 applies one or more transformations to the obtained datasets prior to generation of the data snapshot 154. The transformations can include masking of sensitive data values, selection of a subset of data records from the data source for inclusion in the datasets for migration, or generation of data for inclusion in the datasets for migration. Each of these transformations is described in the following paragraphs. When the migration system 150 applies a transformation to the datasets, data characterizing the transformation are stored in the data snapshot 154. Access to these characterization data facilitates auditability and traceability of the migrated data records, in that information specifying the applied transformations is stored and hashed along with the datasets themselves.

One example of a transformation is a masking of sensitive values (e.g., personally identifiable information (PII), such as names, birth dates, social security numbers, or other such information) in the data records. Masking of sensitive values is relevant, e.g., when data records are migrated outside of a federated database system, for instance, because the data records may then be exposed to or accessible to external systems or users. The migration system 150 can implement masking algorithms that automatically detect PII, e.g., based on a semantic discovery analysis of field names to identify fields containing PII, and can mask these values prior to storing the data records in the data snapshot 154. Semantic discovery is described in more detail in US 2020/0380212, the contents of which are incorporated here by reference in their entirety. Data characterizing the masking algorithm, such as the names of the fields identified in the semantic discovery analysis, are stored in the data snapshot.

Another example of a transformation is the selection of data records for migration. Selection of data records enables for migration of a representative subset of the data records contained in the data source (e.g., the data records contained in the database 106). Migration of a subset of data records can be useful, e.g., when the migrated data records will be used for downstream testing or data quality purposes. For testing or data quality, processing an entire dataset can be resource intensive, and sufficiently accurate testing or data quality results can be obtained by performing the testing or data quality analysis on a representative subset of data records rather than on the entire dataset. The migration system 150 can implement subsetting functionality, e.g., as described in U.S. Pat. No. 9,892,026, the contents of which are incorporated here by reference in their entirely, to select data records for migration. The selected data records, rather than the entire dataset at the data source 106, are stored in the data snapshot. Data characterizing the subsetting algorithm (e.g., rules governing selection of the subset of the data records) also are stored in the data snapshot.

A third example of a transformation is the generation of data to be included in the data records for migration. Generating data can be relevant, e.g., when the data records are to be used for downstream testing or data quality purposes, but do not include data spanning a complete range of possible values or categories. Data generation can involve generation of data to be contained in one or more fields of existing data records obtained from the data source 106, generation of new data records to be migrated in addition to the data records obtained from the data source 106, or both. The migration system 150 can implement data generation functionality, e.g., as described in U.S. Pat. No. 10,185,641, the contents of which are incorporated here by reference in their entirety, to generate data to be included in the data records for migration. The data records obtained from the data source 106, supplemented with generated values in one or more of the fields of the obtained data records and/or with newly generated data records, are stored in the data snapshot. Data characterizing the data generation algorithm (e.g., rules governing the fields identified for data generation, the profile of the generated data, or other rules) also are stored in the data snapshot.

In some examples, the data snapshot, or one or more individual datasets in the data snapshot, can be edited after generation of the data snapshot, and a new hash recomputed after the editing. This can be useful, e.g., to add a dataset to the data snapshot or to update one or more of the datasets prior to migration.

The generation of a data snapshot 154 as part of dataset migration is advantageous in that the data snapshot 154 retains information indicative of the origin of a dataset (e.g., a source database, a source record format, a timestamp of retrieval from the source, etc.) and retains information indicative of transformations applied to the dataset during the migration process (e.g., masking, subsetting, data generation, reformatting, etc.). Responsive to a request to trace the lineage of a dataset at the target database 110, the metadata in the data snapshot 154 can be retrieved to reveal the origin of and transformations applied to the dataset.

Figure 2:
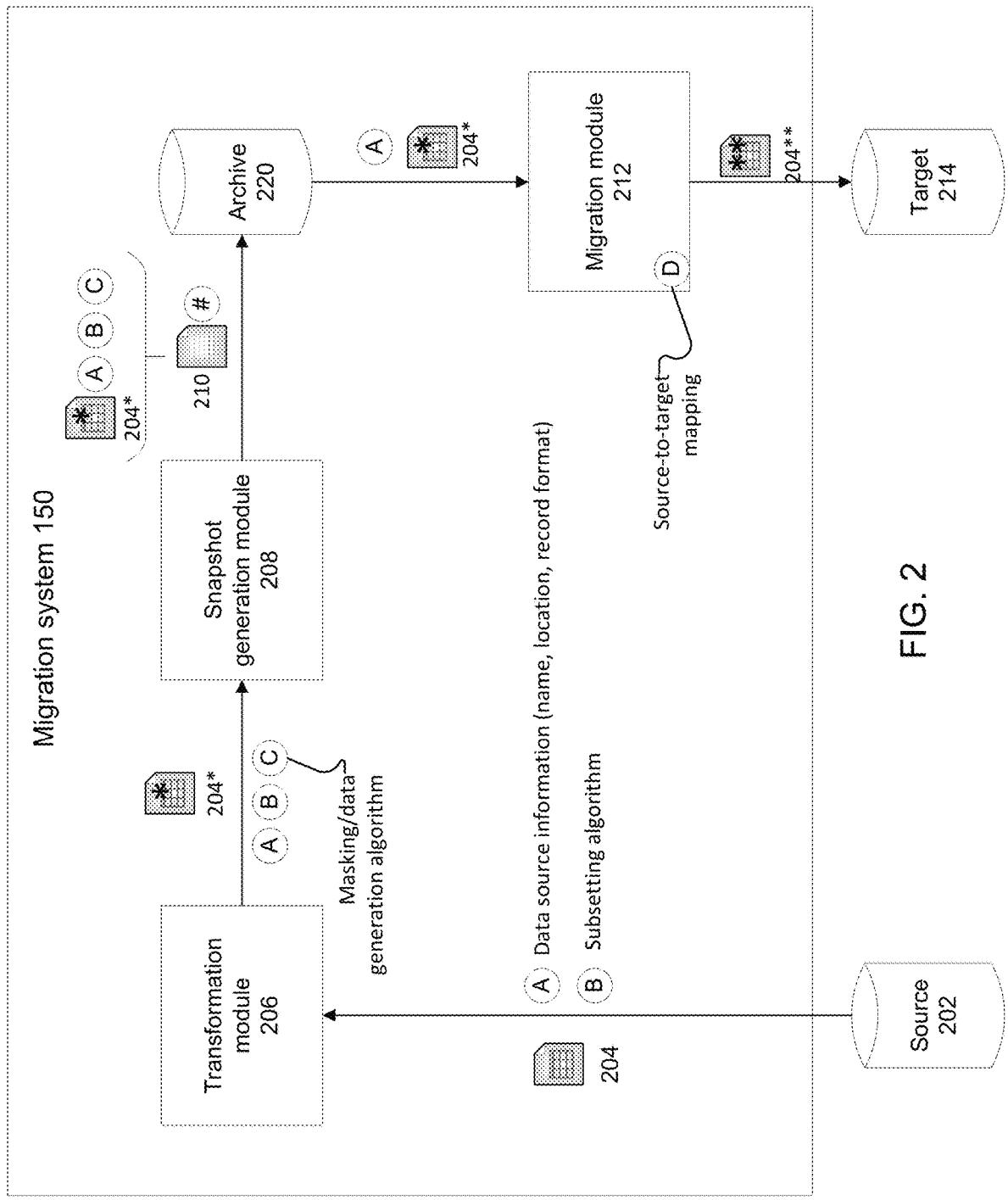
FIG. 2 is a block diagram of a migration system.

FIG. 2 is a block diagram of the migration system 150. One or more datasets 204 are obtained from a data source 202 in a federated database system and received into a transformation module 206 of the migration system 150. The transformation module also obtains data "A" indicative of the origin of the datasets 204, e.g., the identity and location of the data source 202, a record format of data records in the data source 202, or other information about the dataset origin.

In some examples, only a subset of data records in a dataset at the data source 202 are obtained as the dataset 204 for migration. In these examples, the transformation module 206 implements a subsetting algorithm to select the data records that make up the dataset 204. Data "B" characterizing the subsetting algorithm are generated.

In some examples, the transformation module 206 applies one or more transformations to the obtained dataset 204, such as data generation or data masking. The application of these transformations results in a transformed dataset 204*, e.g., a dataset in which PII values have been masked or a dataset in which additional data values or data records have been generated. Data "C" indicative of these transformations, e.g., characterizing the data generation and/or data masking algorithm, are generated.

The transformed dataset 204* as well as the characterizing data A, B, and C are provided from the transformation module 206 to a snapshot generation module 208. The snapshot generation module 208 generates a data snapshot 210 containing the transformed dataset 204* and the characterizing data A, B, and C. The snapshot generation module 208 also computes a hash # of the contents of the data snapshot. In the illustrated example, the hash is based on the entire contents of the data snapshot 210, but as discussed above, in some examples, a hash is computed for each individual dataset. The computed hash # is watermarked into the data snapshot 210. The watermarking helps to ensure data integrity. One example approach to watermarking the data snapshot involves embedding watermark data into the data snapshot 210, which can later be retrieved to determine whether changes have been made to the data snapshot 210 subsequent to the watermarking.

The snapshot generation module 210 stores the data snapshot 210, including the hash #, in a data storage, such as a versioned archive 220. In the illustrated example, the archive 220 is shown as part of the migration system 150, but in some examples, the archive 220 is external to the migration system 150.

A migration module 212 manages migration of the datasets from the data snapshot 210 to a target destination 214, e.g., a data storage in a federated database system, a cloud-based data storage, a local data storage, etc. Prior to providing the datasets to the target destination 214, the migration module 214 recomputes the hash of the data snapshot 210 or of one or more of the individual datasets in the data snapshot 210. If the recomputed hash matches the hash that is watermarked into the data snapshot 210, this is a confirmation that the datasets have not been edited after generation of the data snapshot, and that dataset migration can proceed.

The migration module 212 retrieves the dataset 204* from the data snapshot 210. The migration module 212 also retrieves the data A characterizing the origin of the dataset. Based on a mapping "D" between a format of the source 202 of the dataset and a format of the target destination 214, the migration module 212 applies one or more transformations to the dataset 204* to generate a transformed dataset 204. The transformations can include, e.g., a reformat of the data records in the dataset, a renaming of tables or schema in the dataset, or other transformations, such as other format transformations. The migration module 212 then provides the transformed dataset 204 to the target destination 214.

In some examples, the functionality of the migration system is implemented in one or more executable dataflow graphs, which are computer programs that, when executed, receive data records from a data source, process data contained in fields of the data records, and output processed data to a data target. An executable dataflow graph is a computer program in the form of a graph that includes nodes, which are executable data processing components and data resources such as data sources and data targets. Nodes can receive data records within the graph, process data contained in the data records, such as values in fields of the data records, and output results of the processing in data records, which are forwarded to a destination within the graph, such as a data resource, e.g. data target. Data resources are repositories of data, such as data records, e.g., sources of data to be processed or used during execution of the dataflow graph or destinations (targets) for processed data records output by the dataflow graph. Data resources are, for example, files, databases (e.g., tables of databases), queues, objects, or other types of data sources or targets. A link connecting two nodes of a graph is provided for a flow of information and/or data, such as data records, between the nodes. The executable dataflow graph is configurable to, when executed, process data contained in fields of data records. Dataflow graphs (sometimes referred to as graphs) can be data processing graphs or plans that control execution of one or more graphs. In some examples, one or more data processing components of a dataflow graph is a sub-graph. A data flow graph implements a graph-based computation performed on data flowing from one or more input data sets through a graph of processing graph components to one or more output data sets, wherein the data flow graph is specified by data structures in a data storage, the dataflow graph having the plurality of nodes that are specified by the data structures that are connected by one or more links, the links being specified by the data structures and representing data flows between the nodes. A runtime environment for the dataflow graph may be coupled to the data storage and may be hosted on one or more computers, the runtime environment including an execution module configured to read the stored data structures specifying the data flow graph and to allocate and configure computing resources, such as processes, for performing the computation of the graph components that are assigned to the data flow graph by the execution module. The execution module may schedule and control execution of the assigned processes such that the methods described here may be executed.

Figure 3A:
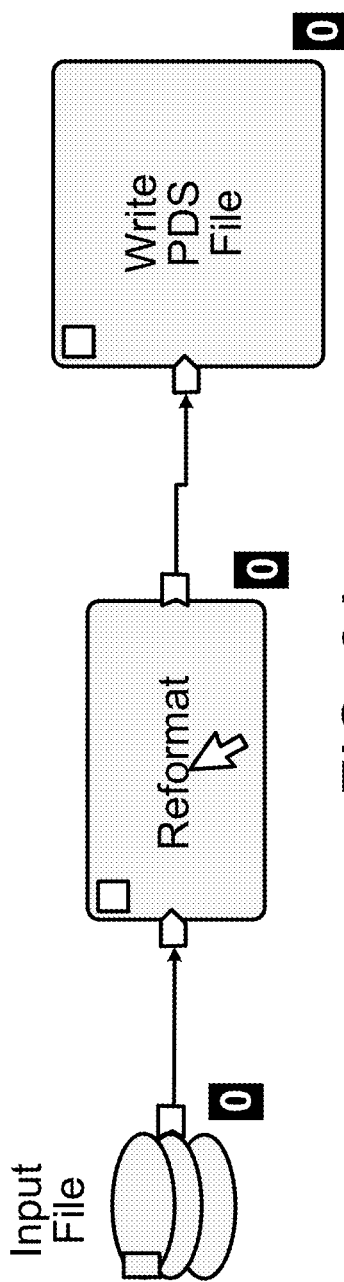
FIGS. 3A and 3B are dataflow graphs.
Figure 3B:
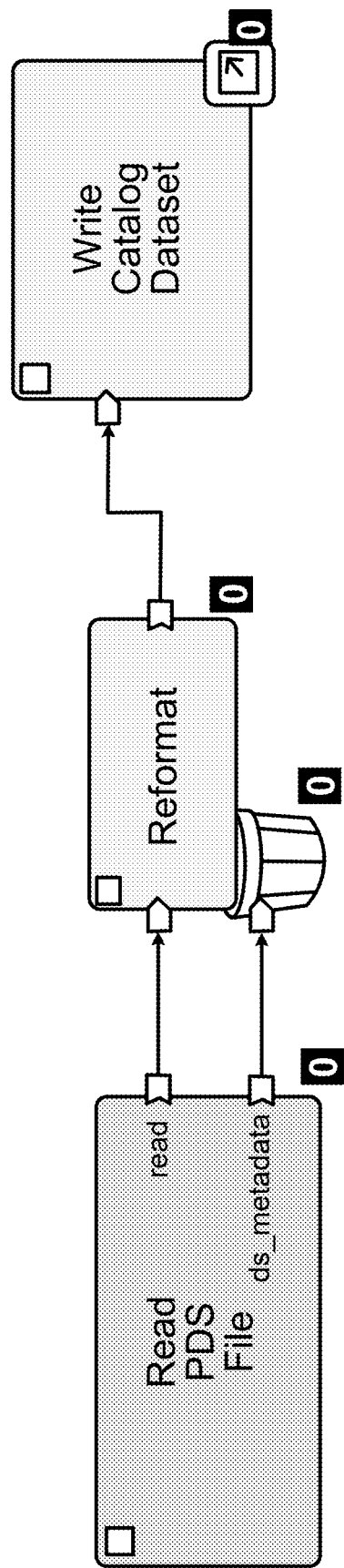

FIGS. 3A and 3B are example dataflow graphs 300, 350 that implement simplified functionality of aspects of the migration system. The dataflow graph 300 is a dataflow graph for writing a dataset to a data snapshot, and includes a component 302 to obtain a dataset from a data source, a component 304 to reformat the dataset (e.g., to apply one or more transformations, such as subsetting, masking, or data generation), and a component 306 to write the reformatted dataset to a data snapshot. The dataflow graph 350 is a dataflow graph for migrating a dataset from a data snapshot to a data target, and includes a component 352 to read a dataset from a data snapshot, a component 354 to reformat the dataset (e.g., based on a source-to-target mapping specifying a target format such as a record format or a database schema naming convention), and a component 356 to write the dataset to the data target.

Figure 4:
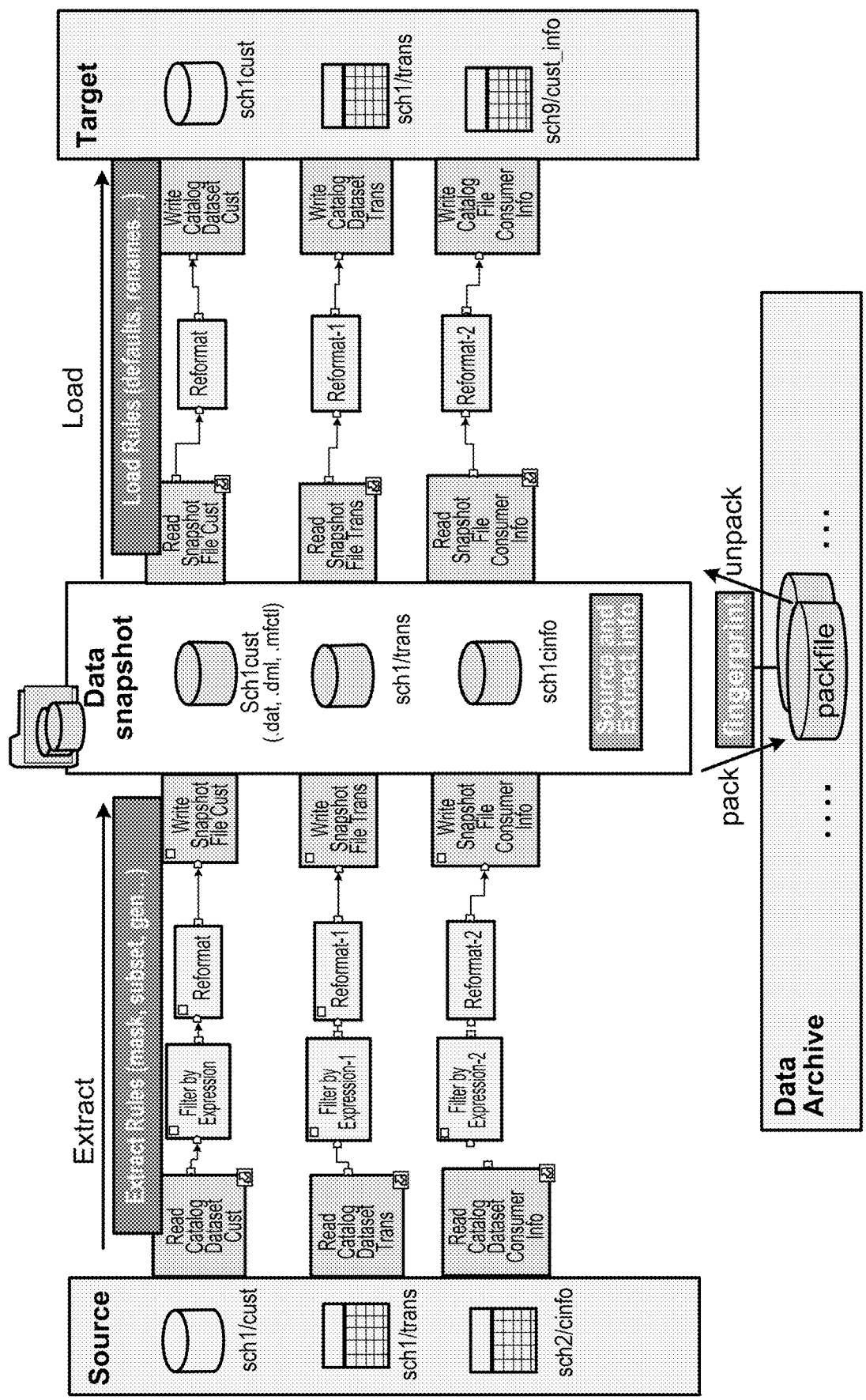
FIG. 4 is a diagram of dataset migration.

FIG. 4 illustrates another example of a dataflow graph 400 implementing functionality for migration of datasets in a federated database system context. The dataflow graph 400 reads datasets from multiple data sources 402a, 402b, 402c of different types/formats in a federated database system 401 and migrates the datasets, using a data snapshot 420, to multiple data targets 452a, 452b, 452c in a different federated database system 451. The dataflow graph 400 includes a data snapshot generation portion 404 that is implemented in parallel for each of the data sources 402. The data snapshot generation portion 404 includes, for each data source 402, a read component 406 that reads the dataset from the data source 402, a filter component 408 that performs a filter operation on the data records of the dataset, a reformat component 410 that reformats the dataset, and a write component 412 that writes each reformatted dataset 402\* to the data snapshot 420. In addition to the reformatted datasets 402\*, the data snapshot 420 includes data characterizing the origin of the reformatted datasets 402\* and the transformations applied to the datasets. The data snapshot 420, watermarked with a fingerprint (e.g., a hash), is stored in a data storage, such as a versioned archive.

The dataflow graph 400 includes a data migration portion 454 that is implemented in parallel for each dataset 402\* to be migrated from the data snapshot 420 to the data targets 452. The data migration portion 454 includes, for each dataset 402\*, a read component 456 that reads the dataset from the data snapshot 420, a reformat component 458 that reformats the dataset e.g., based on a format of the data target, and a write component 460 that writes each reformatted dataset 402\*\* to the respective data target 452.

Figure 5:
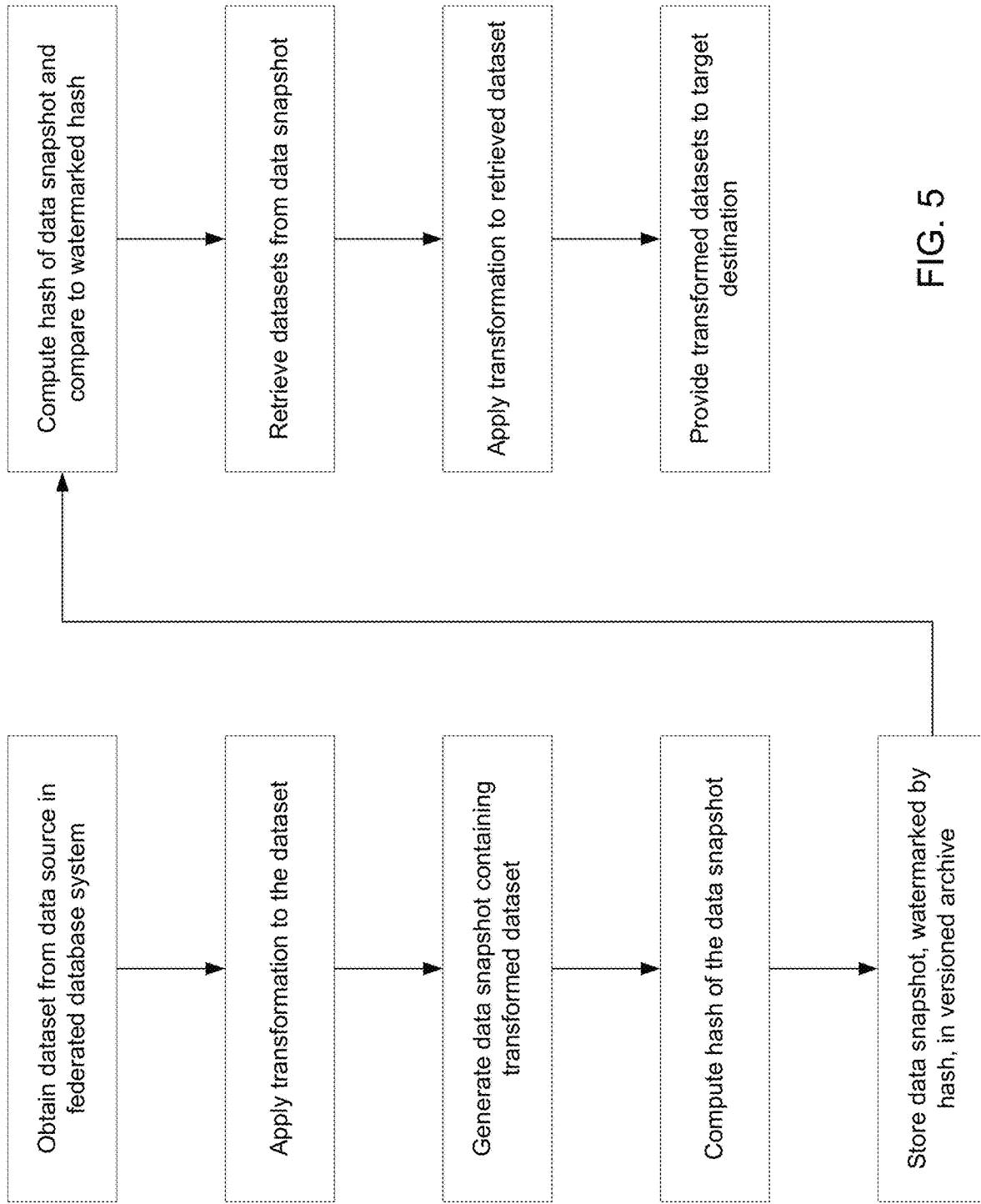
FIG. 5 is a flow chart.

Referring to FIG. 5, in an example process for migrating datasets in the context of a federated database system, a dataset is obtained from a data source in a federated database system (500). A transformation is applied to the dataset (502). For instance, sensitive values (e.g., personally identifiable information) is masked in data records of the dataset, a subset of the data records in the dataset are selected, or data values or data records are generated for inclusion in the dataset.

A data snapshot is generated (504). The data snapshot contains the transformed data records and data characterizing the dataset, e.g., data identifying the origin of the dataset and/or data indicative of the transformations applied to the dataset. A fingerprint, such as a hash, of the data snapshot is calculated (506). The data snapshot, watermarked by the hash, is stored in a data storage, such as a versioned archive (508).

To migrate the datasets from the data snapshot to a target destination, a hash of the data snapshot is computed and compared to the watermarked hash to confirm that the datasets in the data snapshot have not been modified (510). Responsive to confirming that the datasets have not been edited, the datasets are retrieved from the data snapshot (512). Based on a mapping between the data source and the target destination, e.g., a mapping between their formats, a transformation is applied to the datasets retrieved from the data snapshot (512). For instance, a record format transformation is applied or a database schema or table naming convention is updated. The transformed datasets are provided to the target destination (514).

Figure 6:
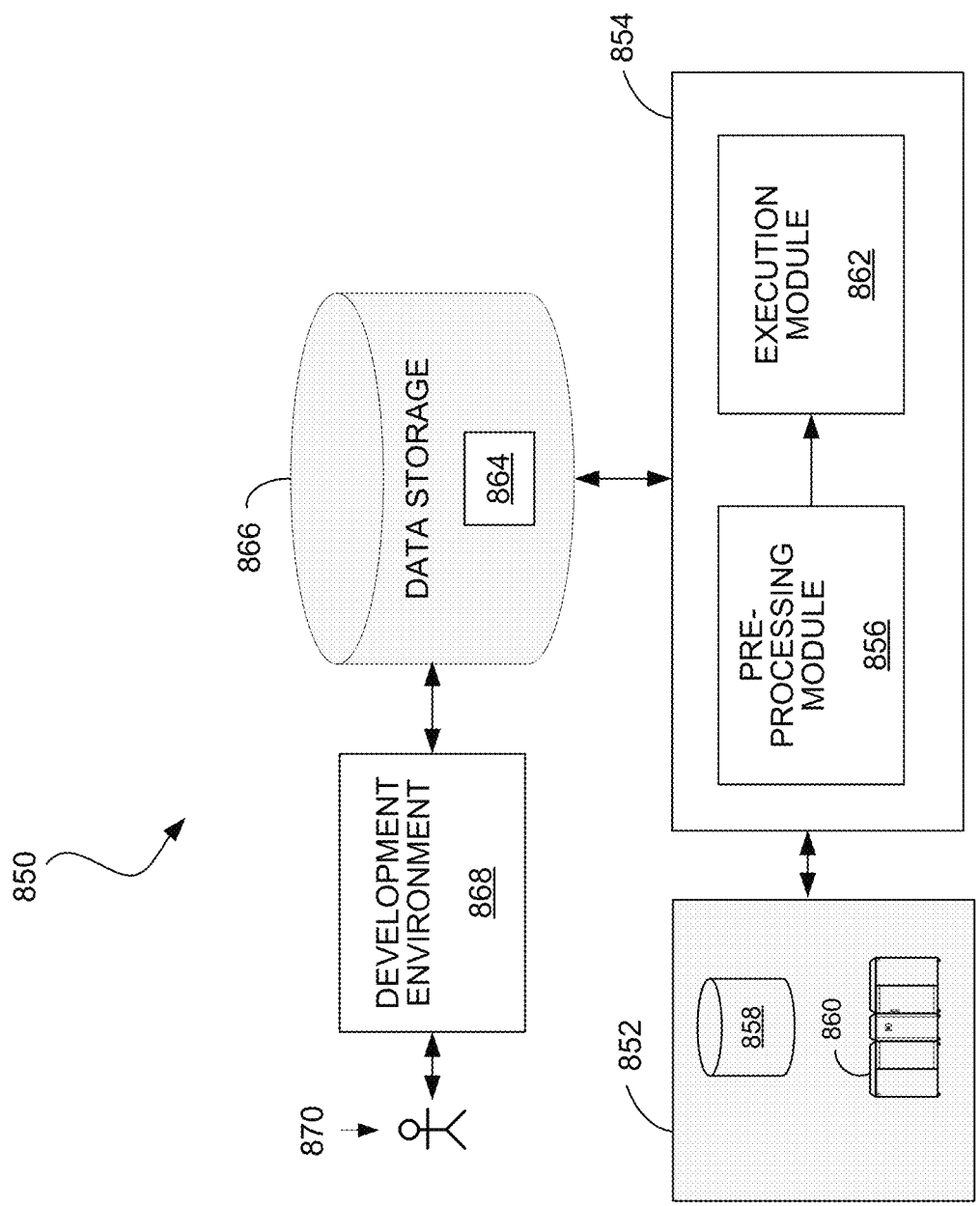
FIG. 6 is a diagram of a computing system.

FIG. 6 shows an example of a data processing system 850 for developing and executing dataflow graphs in which the techniques described here can be used. The system 850 includes a data source 852 that may include one or more sources of data such as storage devices or connections to online data streams, each of which may store or provide data in any of a variety of formats (e.g., database tables, spreadsheet files, flat text files, or a native format used by a mainframe computer). The data may be logistical data, analytic data or industrial machine data. An execution environment or runtime environment 854 includes a pre-processing module 856 and an execution module 862. The execution environment 854 may be hosted, for example, on one or more general-purpose computers under the control of a suitable operating system, such as a version of the UNIX operating system. For example, the execution environment 854 can include a multiple-node parallel computing environment including a configuration of computer systems using multiple processing units (such as central processing units, CPUs) or processor cores, either local (e.g., multiprocessor systems such as symmetric multi-processing (SMP) computers), or locally distributed (e.g., multiple processors coupled as clusters or massively parallel processing (MPP) systems, or remote, or remotely distributed (e.g., multiple processors coupled via a local area network (LAN) and/or wide-area network (WAN)), or any combination thereof.

Storage devices providing the data source 852 may be local to the execution environment 854, for example, being stored on a storage medium (e.g., hard drive 858) connected to a computer hosting the execution environment 854, or may be remote to the execution environment 854, for example, being hosted on a remote system (e.g., mainframe computer 860) in communication with a computer hosting the execution environment 854, over a remote connection (e.g., provided by a cloud computing infrastructure).

The pre-processing module 856 reads data from the data source 852 and prepares data processing applications (e.g. an executable dataflow graph) for execution. For instance, the pre-processing module 856 can compile the data processing application, store and/or load a compiled data processing application to and/or from a data storage system 866 accessible to the execution environment 854, and perform other tasks to prepare a data processing application for execution.

The execution module 862 executes the data processing application prepared by the pre-processing module 856 to process a set of data and generate output data 864 that results from the processing. The output data 864 may be stored back in the data source 852 or in a data storage system 866 accessible to the execution environment 854, or otherwise used. The data storage system 866 is also accessible to an optional development environment 868 in which a developer 870 is able to design and edit the data processing applications to be executed by the execution module 862. The development environment 868 is, in some implementations, a system for developing applications as dataflow graphs that include vertices (representing data processing components or datasets) connected by directed links (representing flows of work elements, i.e., data) between the vertices. For example, such an environment is described in more detail in U.S. Patent Publication No. 2007/0011668, titled "Managing Parameters for Graph-Based Applications," the contents of which are incorporated here by reference in their entirety. A system for executing such graph-based computations is described in U.S. Pat. No. 5,966,072, titled "Executing Computations Expressed as Graphs," the contents of which are incorporated here by reference in their entirety. Dataflow graphs made in accordance with this system provide methods for getting information into and out of individual processes represented by graph components, for moving information between the processes, and for defining a running order for the processes. This system includes algorithms that choose interprocess communication methods from any available methods (for example, communication paths according to the links of the graph can use TCP/IP or UNIX domain sockets, or use shared memory to pass data between the processes).

The pre-processing module 856 can receive data from a variety of types of systems that may embody the data source 852, including different forms of database systems. The data may be organized as records having values for respective fields (also called "attributes" or "columns"), including possibly null values. When first reading data from a data source, the pre-processing module 856 typically starts with some initial format information about records in that data source. In some circumstances, the record structure of the data source may not be known initially and may instead be determined after analysis of the data source or the data. The initial information about records can include, for example, the number of bits that represent a distinct value, the order of fields within a record, and the type of value (e.g., string, signed/unsigned integer) represented by the bits.

In other words, and generally applicable to executable dataflow graphs described herein, the executable dataflow graph implements a graph-based computation performed on data flowing from one or more input data sets of a data source 852 through the data processing components to one or more output data sets, wherein the dataflow graph is specified by data structures in the data storage 864, the dataflow graph having the nodes that are specified by the data structures and representing the data processing components connected by the one or more links, the links being specified by the data structures and representing data flows between the data processing components. The execution environment or runtime environment 854 is coupled to the data storage 864 and is hosted on one or more computers, the runtime environment 854 including the pre-processing module 856 configured to read the stored data structures specifying the dataflow graph and to allocate and configure system resources (e.g. processes, memory, CPUs, etc.) for performing the computation of the data processing components that are assigned to the dataflow graph by the pre-processing module 856, the runtime environment 854 including the execution module 862 to schedule and control execution of the computation of the data processing components. In other words, the runtime or execution environment 854 hosted on one or more computers is configured to read data from the data source 852 and to process the data using an executable computer program expressed in form of the dataflow graph.

The approaches described above can be implemented using a computing system executing suitable software. For example, the software may include procedures in one or more computer programs that execute on one or more programmed or programmable computing system (which may be of various architectures such as distributed, client/server, or grid) each including at least one processor, at least one data storage system (including volatile and/or non-volatile memory and/or storage elements), at least one user interface (for receiving input using at least one input device or port, and for providing output using at least one output device or port). The software may include one or more modules of a larger program, for example, that provides services related to the design, configuration, and execution of graphs. The modules of the program (e.g., elements of a graph) can be implemented as data structures or other organized data conforming to a data model stored in a data repository.

The software may be provided on a tangible, non-transitory medium, such as a CD-ROM or other computer-readable medium (e.g., readable by a general or special purpose computing system or device), or delivered (e.g., encoded in a propagated signal) over a communication medium of a network to a tangible, non-transitory medium of a computing system where it is executed. Some or all of the processing may be performed on a special purpose computer, or using special-purpose hardware, such as coprocessors or field-programmable gate arrays (FPGAs) or dedicated, application-specific integrated circuits (ASICs). The processing may be implemented in a distributed manner in which different parts of the computation specified by the software are performed by different computing elements. Each such computer program is preferably stored on or downloaded to a computer-readable storage medium (e.g., solid state memory or media, or magnetic or optical media) of a storage device accessible by a general or special purpose programmable computer, for configuring and operating the computer when the storage device medium is read by the computer to perform the processing described herein. The inventive system may also be considered to be implemented as a tangible, non-transitory medium, configured with a computer program, where the medium so configured causes a computer to operate in a specific and predefined manner to perform one or more of the processing steps described herein.

Embodiment 1. A method for migrating data records to a federated database system, the method including: obtaining data records from a data source in a first federated database system; generating a data snapshot file based on the obtained data records and data indicative of a characteristic associated with the obtained data records; generating a hash of the data snapshot file to prevent modification of the data snapshot file; storing the data snapshot file and the generated hash in a data storage; migrating the obtained data records from the data snapshot file to a data target in a second federated database system, the migrating including: retrieving the data records from the data snapshot file stored in the data storage; providing the retrieved data records to the data target according to a mapping between a characteristic of the data source and a characteristic of the data target.

Embodiment 2. The method of embodiment 1, in which the migrating includes confirming that the data snapshot file that was stored in the data storage has not been edited, and wherein the retrieving of the data records from the data snapshot file is performed responsive to the confirming.

Embodiment 3. The method of embodiment 2, in which confirming that the data snapshot file has not been edited comprises: recalculating the hash of the data snapshot file that was stored in the data storage; and comparing the recalculated hash to the generated hash.

Embodiment 4. The method of any one of the preceding embodiments, in which the mapping between the characteristic of the data source and the characteristic of the data target comprises a specification of a second record format of data records of the data target, and in which the migrating includes determining a correspondence between a first record format of the data records from the data source and the second record format of data records of the data target.

Embodiment 5. The method of embodiment 4, comprising, when the first record format is different from the second record format, transforming the retrieved data records into the second record format in accordance with the correspondence; and providing the transformed data records to the data target.

Embodiment 6. The method of any one of embodiments 4 or 5, further comprising: processing, by the second federated database system, the data records provided to the data target in accordance with the second record format.

Embodiment 7. The method of any one of embodiments 4 to 6, wherein the second federated database system does not have built-in functionality to process the retrieved data records in accordance with the first record format.

Embodiment 8. The method of any one of the preceding embodiments, comprising providing the retrieved data records to the data target according to a mapping between a naming convention used by the data source and a naming convention used by the data target.

Embodiment 9. The method of any one of the preceding embodiments, in which the data indicative of the characteristic associated with the obtained data records includes one or more of a name of the data source or a location of the data source.

Embodiment 10. The method of any one of the preceding embodiments, in which the data indicative of the characteristic associated with the obtained data records includes metadata associated with the data records.

Embodiment 11. The method of embodiment 10, in which the metadata associated with the data records comprise a specification of a first record format of the obtained data records.

Embodiment 12. The method of any one of the preceding embodiments, in which generating the data snapshot file includes including data indicative of a data governance rule associated with the source system.

Embodiment 13. The method of any one of the preceding embodiments, comprising masking sensitive data, such as data associated with personally identifying information, contained in one or more fields of the obtained data records prior to generating the data snapshot file.

Embodiment 14. The method of embodiment 13, in which generating a data snapshot file based on the obtained data records comprises generating a data snapshot file that comprises the masked data records.

Embodiment 15. The method of any one of embodiments 13 to 14, in which the metadata associated with the data records comprise data specifying a transformation used for the masking of the data contained in the obtained data records.

Embodiment 16. The method of any one of embodiments 13 to 15, in which generating the data snapshot file includes including data in the file identifying the one or more fields of the data records that were subject to the masking.

Embodiment 17. The method of any one of embodiments 13 to 16, comprising identifying the one or more fields containing the sensitive data based on a semantic analysis of a name of each of the one or more fields.

Embodiment 18. The method of any one of embodiments 13 to 17, in which generating the hash includes generating a hash of data indicative of a masking algorithm applied to mask the sensitive data.

Embodiment 19. The method of any one of the preceding embodiments, in which obtaining the data records includes selecting a subset of the data records contained in the data source, the selecting based on values in each of one or more fields of the data records contained in the data source.

Embodiment 20. The method of embodiment 19, in which generating a data snapshot file based on the obtained data records comprises generating a data snapshot file including the selected subset of the data records.

Embodiment 21. The method of any one of embodiments 19 to 20, in which the metadata associated with the data records comprise data specifying a subsetting algorithm used to select the subset of the data records contained in the data source.

Embodiment 22. The method of any one of embodiments 19 to 21, in which generating the hash includes generating a hash of data indicative of a selection algorithm applied to select the subset of the data records.

Embodiment 23. The method of any one of the preceding embodiments, including generating data records for inclusion in the obtained data records prior to generating the data snapshot file.

Embodiment 24. The method of embodiment 23, in which generating a data snapshot based on the obtained data records comprises including the obtained data records and the generated data records in the data snapshot.

Embodiment 25. The method of any one of embodiments 23 to 24, including generating data based on a distribution of values in each of one or more fields of the data records obtained from the data source.

Embodiment 26. The method of any one of embodiments 23 to 25, in which generating the hash includes generating a hash of data indicative of a data generation algorithm applied to generate the data records.

Embodiment 27. The method of any one of the preceding embodiments, responsive to a request for a lineage of the transformed data records at the data target, providing data indicative of the data source in the first federated database system.

Embodiment 28. The method of any one of the preceding embodiments, comprising responsive to a request for a lineage of the transformed data records at the data target, providing data indicative of a transformation applied to the data records.

Embodiment 29. The method of any one of the preceding embodiments, wherein the retrieved data records are provided to the data target only after the confirming that the data snapshot file has not been edited.

Embodiment 30. The method of any one of the preceding embodiments, in which the characteristic of the data source includes a first record format of the data records from the data source and the characteristic of the data target comprises a second record format of data records of the data target.

Embodiment 31. The method of embodiment 30, in which providing the retrieved data records to the data target according to the mapping includes transforming the record format of the retrieved data records to match the second record format.

Embodiment 32. The method of embodiment 31, in which transforming the record format of the retrieved data records to match the second record format includes reformatting the retrieved data records.

Embodiment 33. A non-transitory computer readable storage medium storing instructions that, when executed by one or more processors, cause the one or more processors to perform the operations of any one of embodiments 1 to 32.

Embodiment 34. A system comprising one or more processors coupled to a memory, the memory storing instructions that, when executed by the one or more processors, cause the one or more processors to perform the operations of any one of embodiments 1 to 32.

A number of embodiments have been described. Nevertheless, it will be understood that various modifications may be made without departing from the spirit and scope of the invention. For example, some of the steps described above may be order independent, and thus can be performed in an order different from that described.

Other implementations are also within the scope of the following claims.

What is claimed is:

1. A method for migrating data records to a federated database system, the method including:
   obtaining data records from a data source in a first federated database system;
   generating a data snapshot file based on the obtained data records and data indicative of a characteristic associated with the obtained data records;
   generating a hash of the data snapshot file to prevent modification of the data snapshot file;
   storing the data snapshot file and the generated hash in a data storage;
   migrating the obtained data records from the data snapshot file to a data target in a second federated database system, the migrating including:
      retrieving the data records from the data snapshot file stored in the data storage;
      providing the retrieved data records to the data target according to a mapping between a characteristic of the data source and a characteristic of the data target.

2. The method of claim 1, in which the migrating includes confirming that the data snapshot file that was stored in the data storage has not been edited, and wherein the retrieving of the data records from the data snapshot file is performed responsive to the confirming.

3. The method of claim 2, in which confirming that the data snapshot file has not been edited comprises:
   recalculating the hash of the data snapshot file that was stored in the data storage; and
   comparing the recalculated hash to the generated hash.

4. The method of claim 1, in which the mapping between the characteristic of the data source and the characteristic of the data target comprises a specification of a second record format of data records of the data target, and in which the migrating includes determining a correspondence between a first record format of the data records from the data source and the second record format of data records of the data target.

5. The method of claim 4, comprising, when the first record format is different from the second record format, transforming the retrieved data records into the second record format in accordance with the correspondence; and providing the transformed data records to the data target.

6. The method of claim 4, further comprising: processing, by the second federated database system, the data records provided to the data target in accordance with the second record format.

7. The method of claim 4, wherein the second federated database system does not have built-in functionality to process the retrieved data records in accordance with the first record format.

8. The method of claim 1, comprising providing the retrieved data records to the data target according to a mapping between a naming convention used by the data source and a naming convention used by the data target.

9. The method of claim 1, in which the data indicative of the characteristic associated with the obtained data records includes one or more of a name of the data source or a location of the data source.

10. The method of claim 1, in which the data indicative of the characteristic associated with the obtained data records includes metadata associated with the data records.

11. The method of claim 10, in which the metadata associated with the data records comprise a specification of a first record format of the obtained data records.

12. The method of claim 1, in which generating the data snapshot file includes including data indicative of a data governance rule associated with the source system.

13. The method of claim 1, comprising masking sensitive data, such as data associated with personally identifying information, contained in one or more fields of the obtained data records prior to generating the data snapshot file.

14. The method of claim 13, in which generating a data snapshot file based on the obtained data records comprises generating a data snapshot file that comprises the masked data records.

15. The method of claim 13, in which the metadata associated with the data records comprise data specifying a transformation used for the masking of the data contained in the obtained data records.

16. The method of claim 13, in which generating the data snapshot file includes including data in the file identifying the one or more fields of the data records that were subject to the masking.

17. The method of claim 13, comprising identifying the one or more fields containing the sensitive data based on a semantic analysis of a name of each of the one or more fields.

18. The method of claim 13, in which generating the hash includes generating a hash of data indicative of a masking algorithm applied to mask the sensitive data.

19. The method of claim 1, in which obtaining the data records includes selecting a subset of the data records contained in the data source, the selecting based on values in each of one or more fields of the data records contained in the data source.

20. The method of claim 19, in which generating a data snapshot file based on the obtained data records comprises generating a data snapshot file including the selected subset of the data records.

21. The method of claim 19, in which the metadata associated with the data records comprise data specifying a subsetting algorithm used to select the subset of the data records contained in the data source.

22. The method of claim 19, in which generating the hash includes generating a hash of data indicative of a selection algorithm applied to select the subset of the data records.

23. The method of claim 1, including generating data records for inclusion in the obtained data records prior to generating the data snapshot file.

24. The method of claim 23, in which generating a data snapshot based on the obtained data records comprises including the obtained data records and the generated data records in the data snapshot.

25. The method of claim 23, including generating data based on a distribution of values in each of one or more fields of the data records obtained from the data source.

26. The method of claim 23, in which generating the hash includes generating a hash of data indicative of a data generation algorithm applied to generate the data records.

27. The method of claim 1, responsive to a request for a lineage of the transformed data records at the data target, providing data indicative of the data source in the first federated database system.

28. The method of claim 1, comprising responsive to a request for a lineage of the transformed data records at the data target, providing data indicative of a transformation applied to the data records.

29. The method of claim 1, wherein the retrieved data records are provided to the data target only after the confirming that the data snapshot file has not been edited.

30. The method of claim 1, in which the characteristic of the data source includes a first record format of the data records from the data source and the characteristic of the data target comprises a second record format of data records of the data target.

31. The method of claim 30, in which providing the retrieved data records to the data target according to the mapping includes transforming the record format of the retrieved data records to match the second record format.

32. The method of claim 31, in which transforming the record format of the retrieved data records to match the second record format includes reformatting the retrieved data records.

33. A non-transitory computer readable storage medium storing instructions that, when executed by one or more processors, cause the one or more processors to perform the operations including:
  obtaining data records from a data source in a first federated database system;
  generating a data snapshot file based on the obtained data records and data indicative of a characteristic associated with the obtained data records;
  generating a hash of the data snapshot file to prevent modification of the data snapshot file;
  storing the data snapshot file and the generated hash in a data storage;
  migrating the obtained data records from the data snapshot file to a data target in a second federated database system, the migrating including:
    retrieving the data records from the data snapshot file stored in the data storage;
    providing the retrieved data records to the data target according to a mapping between a characteristic of the data source and a characteristic of the data target.

34. A system comprising one or more processors coupled to a memory, the memory storing instructions that, when executed by the one or more processors, cause the one or more processors to perform operations including:
  obtaining data records from a data source in a first federated database system;
  generating a data snapshot file based on the obtained data records and data indicative of a characteristic associated with the obtained data records;
  generating a hash of the data snapshot file to prevent modification of the data snapshot file;
  storing the data snapshot file and the generated hash in a data storage;
  migrating the obtained data records from the data snapshot file to a data target in a second federated database system, the migrating including:
    retrieving the data records from the data snapshot file stored in the data storage;
    providing the retrieved data records to the data target according to a mapping between a characteristic of the data source and a characteristic of the data target.

* * * * *